Patented Dec. 9, 1952

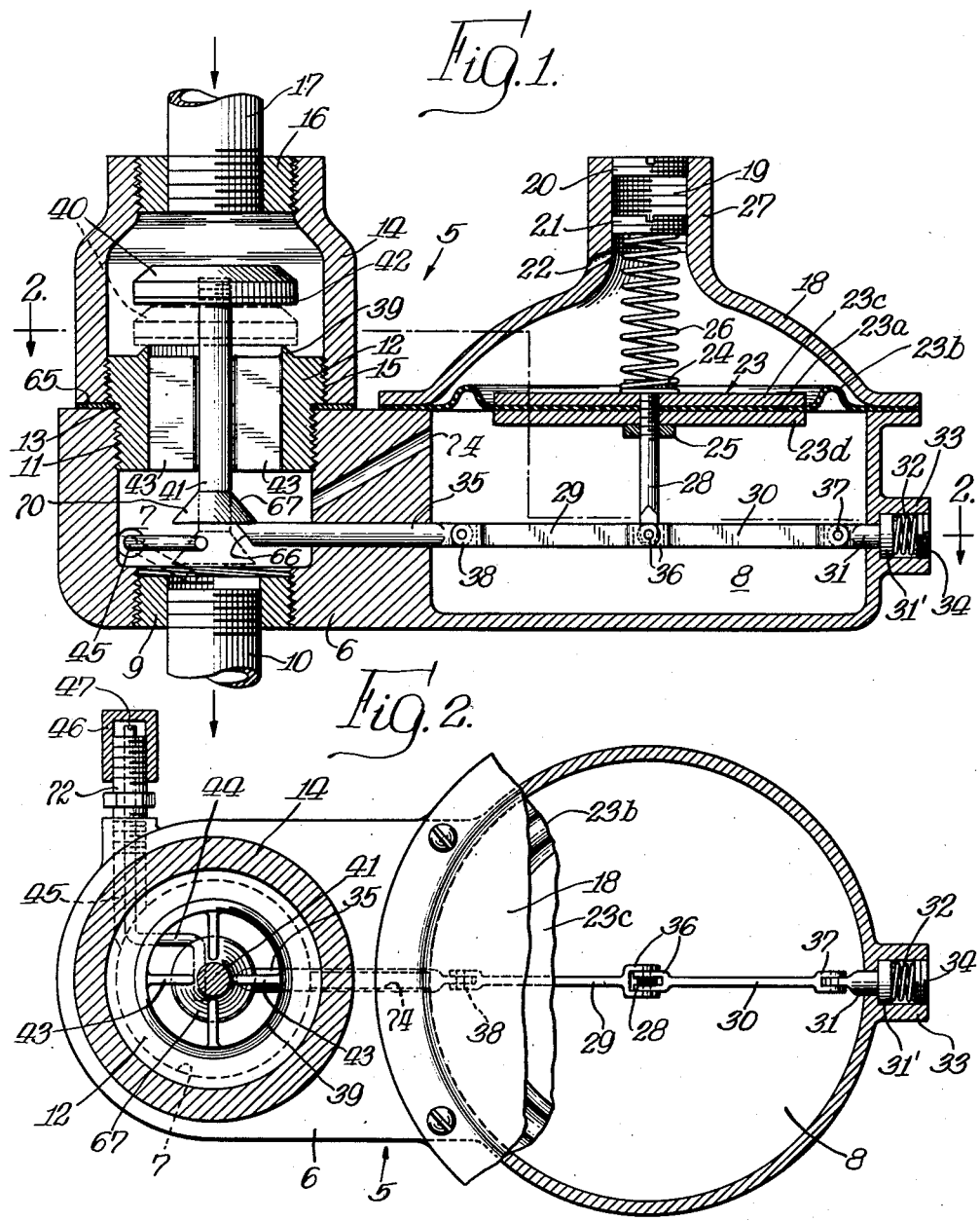

2,620,820

UNITED STATES PATENT OFFICE 2,620,820

HIGH AND LOW PRESSURE SHUT OFF VALVE WITH MANUAL RESET

Paul L. Born, Wilmette, Ill.

Application June 29, 1949, Serial No. 102,043

6 Claims. (Cl. 137—458)

This invention relates to an automatic high and low pressure gas shut-off valve.

Gas flowing in lines supplying industrial and domestic requirements is susceptible to fluctuations in pressure due to the varying loads imposed on the gas lines by the consumer, to leaks present in the lines, and other conditions which are beyond the control of the supplying utility. Due to these fluctuations, there have been instances where pressure on a consumer's premises has become too low or too high for safe operation. A low pressure is dangerous because pilot lights or operating burners may become extinguished, which would result in gas filling the premises when the gas pressure again increases, thereby possibly causing an explosion or asphyxiation of the consumer, and a high pressure is likewise dangerous because the equipment conveying and using the gas may break, thus placing the life and property of the consumer in jeopardy.

Heretofore, when the gas pressure became so low, or so high, as to become dangerous, it has been necessary for the utility company to send out a man to the consumer's premises to shut off the supply of gas, until such time, as the pressure again returned to normal, and then have a man return to restore the supply of gas. Obviously, this procedure causes the utility a great deal of expense and results in inconvenience to the consumer, since he may be forced to be without gas service for a considerable time.

It is an object of my invention to provide a valve adapted to be inserted in a gas line and operable automatically to terminate the flow of gas in the line when the gas pressure falls below a pre-determined minimum, or exceeds a predetermined maximum.

It is another object of my invention to provide a gas shut-off valve of the character noted, embodying a diaphragm and having a toggle valve release mechanism connected thereto, which when the toggle mechanism is urged upward, due to an excessively high gas pressure exerted on the diaphragm, will release a valve member to its normally closed position, and which likewise, when the toggle mechanism is urged downward, due to an abnormally low gas pressure acting against the diaphragm, will release the valve member to its normally closed position.

The use of a toggle mechanism provides for the certain and accurate release of the valve member, and since the mechanism moves when the pressure fluctuates, dust and corrosion are not allowed to collect, which thus keeps the mechanism from sticking.

A further object of my invention is to provide an automatic high and low pressure gas shut-off valve with a reset lever, to which access may be had from the exterior of the valve in order to return the valve to its open position, with the use of simple tools when the gas supply remains normal.

A still further object of my invention is to provide a gas shut-off valve which has sufficient latitude to accommodate pressure drops accompanying increases in the line load, or to accommodate pressure rises accompanying no load conditions, without closing.

It is a still further object of my invention to provide a gas shut-off valve which may be readily adapted for use with a majority of the present gas installations in service by simply changing the face bushings in the inlet and outlet connections of the valve.

It is a still further object of my invention to provide an automatic high and low pressure gas shut-off valve that is of simple and inexpensive construction.

Now in order to acquaint those skilled in the art with the manner of constructing and using an automatic high and low pressure gas shut-off valve in accordance with the principles of my invention, I shall describe in connection with the accompanying drawing a preferred embodiment of my invention.

In the drawing:

Figure 1 is a vertical lengthwise sectional view of the gas shut-off valve of my invention with certain parts being shown in elevation; and Figure 2 is a horizontal sectional view taken substantially along the line 2—2 of Figure 1, looking in the direction indicated by the arrows.

Referring now to Figures 1 and 2, there is shown an automatic high and low pressure gas shut-off valve, embodying my invention indicated generally by the reference numeral 5. The valve 5 has a housing 6 which is divided into two chambers 7 and 8. An internally threaded outlet opening is formed in the lower end of the chamber 7, and an adapter member 9 is disposed therein for receiving the free end of a tube or pipe 10. Threaded into the upper end of the chamber 7, as at 11, is a tubular valve member 12 having a shoulder portion 13. Onto the upper end portion of the valve member 12 is threaded a tubular housing 14, as indicated at 15. Between the shoulder 13 of the valve member 12, the lower edge of the tubular section 14, and the upper edge of the chamber 7, is disposed an annular gasket 65 which forms a seal against the escape of gas from the chamber 7. The tubular housing 14 has an internally threaded inlet opening formed in its upper end, and an adapter member 16 is disposed therein for receiving the threaded end of a tube or pipe 17. The adapter members 9 and 16 are of known construction, and are used so that the inlet and outlet openings may be easily adapted to receive various sizes of pipes, such as indicated by 10 and 17. Of course, the housings 6 and 14 may also be used without adapters 9 and 16 by sizing the inlet and outlet openings to the pipe size desired.

The open end of the chamber 8 is closed by a cover member 18 having a tubular neck portion 27. The neck portion 27 has an internally threaded opening 19 formed therein for receiving a pair of disc members 20 and 21, the purpose of which will hereinafter be described. Disposed between the chamber 8 and the cover member 18 is a diaphragm 23, which comprises a flexible member 23a having an annular bead 23b providing for flexing of the member 23a and upper and lower reinforcing panels 23c and 23d.

A vertical link 28 of a toggle mechanism has connection at its upper end centrally of the diaphragm, and preferably includes a threaded head 24 which serves as a seat for a spring 26 disposed between the diaphragm 23 and the disc 21 of the cover member 18, hereinabove mentioned. The vertical link 28 is threaded at its upper end and a nut member 25 has threaded engagement with such threads to provide for securely mounting the link to the diaphragm. The disc 21 may be adjusted so as to vary the pressure exerted by the spring 26 on the diaphragm 23. The spring 26 may be adjusted so that it exerts substantially no downward biasing force on diaphragm 23, but may yet offer substantial resistance to upward movement of the diaphragm. The disc 20 is used to keep dirt out of the internal threads of the neck portion 27 of the cover member 18, and also to keep unauthorized persons from tampering with the disc 21.

As shown, the toggle mechanism is located within the chamber portion 8, and the link 28 at its lower end is pivotally mounted by a pair of clevis joints, as at 36, to a pair of substantially horizontal links 29 and 30. The link 30 adjacent its other end is pivotally mounted, as by a clevis joint 37, to an anchor member 31 which extends through a side of the chamber 8. The anchor member 31 is provided with an enlarged head portion 31' which is disposed within a tubular extension 33 of the chamber portion 8. The head portion 31' of anchor member 31 is biased inwardly of extension 33 by a coil spring 32, which is held in position by means of a disc member 34 threaded into the opening in the tubular extension 33. The disc member 34 also serves as a gas seal to prevent leakage of gas through extension 33. The free end of rod 29 is pivotally mounted, as by a clevis joint 38, to one end of a valve rod 35 which extends through a suitable bore provided therefor between the chambers 7 and 8.

On the upper surface of the valve member 12, an annular ring 39 is formed which serves as a seat for the valve member 40. The annular ring is formed with an outer conical surface so that the seat 39 is adapted to have substantially line contact with the valve head 40. Preferably, the valve 40 is provided with a soft thin sealing member 42 cemented or vulcanized to the underside thereof. This sealing member may comprise, for example, thin rayon cloth coated with synthetic rubber on both sides, and rolled flat so that it has a plane surface for engagement with valve seat 39.

The valve head 40 has a valve stem 41 threaded at one end therein, which is guided loosely in its vertical movement by spider arms 43 integral with valve member 12. The slight relative movement of valve stem 41 permitted by the construction described avoids the accumulation of dirt which would prevent free operation of the device.

The valve stem 41 at its other end is threaded to a conical member 70, which in the open position of the valve is supported on the free end portion of the rod 35 projecting into chamber 7, as shown in full lines in Figure 1. In the closed position of the valve, the sealing member 42 seats upon the annular valve seat 39, as shown by dotted lines in Figure 1.

A reset member 44 is provided, for engaging the lower surface of the conical end member 70 in order to return the valve 40 from its dotted line closed position to its full open position. A leg 45 of the reset member 44 extends through a brass male coupling 72 threaded in gas tight relation into a boss of housing 6. The outer end of coupling 72 is threaded and receives a gas tight cap 46. The outer end of leg 45 is provided with a slot 47, into which a screw driver or edge of a coin may be inserted for rotating the reset member to raise the valve from its dotted line position to its full line position. Preferably, the closure cap 46 is applied tightly, as by a Stillson wrench, so as to avoid tampering, by un authorized persons, with the valve.

Between the chambers 7 and 8, a port 74 is provided, which connects chambers 7 and 8, and subjects the diaphragm to the pressure of the fluid flowing through the valve. In the cover member 27, a vent hole 22 is provided in order that atmospheric pressure may be maintained above the diaphragm 23. The diameter of the hole 22 is kept small so that if the diaphragm 23 should break, the discharge of gas to the exterior of the valve 5 may be kept to a minimum while the valve 40 is closing. The hole 22 is enlarged at its outward end to decrease the possibility of accidentally closing the same when the valve is painted.

The operation of the valve above described is as follows:

The spring 26 and weight of the diaphragm tend to bias the diaphragm 23 downwardly from the position shown in Figure 1, but the diaphragm is maintained in the position shown in the drawing by the pressure of normal gas flow through the valve. Now, should the gas pressure rise, the diaphragm 23, together with link 28 of the toggle mechanism, are forced upward. This draws the ends of the links 29 and 30, adjacent the pivotal connection 36 upward, which in turn effects movement of the rod 35 to the right from the position shown in Figure 1. When the gas pressure reaches the desired pre-determined maximum pressure, the diaphragm 23 is forced further upward, an amount that causes the rod 35 to be pulled from under the valve stem 41. The valve member 40 then falls, due to gravity, to the seat 39 formed on the valve member 12, as shown by dotted lines in Figure 1, to close the valve.

When the gas pressure returns to normal, the valve may be lifted toward its open position by manually rotating the reset member 44 from its dotted line position to its full line position, as shown in Figure 1. It will be observed that upon resetting of the valve to open position, and assuming the gas has returned to the normal pressure range, that the diaphragm 23 immediately assumes its normal position, which may occur before the valve has been advanced to its fully open position so that the end of rod 35 will be disposed above conical member 70. Upon continued movement of reset member 44, the conical surface 67 of conical member 70 is adapted to have sliding engagement with a conformably angle surface portion 66 at the end of rod 35 moving the latter and links 29 and 30 rectilinearly against the force of spring 32. The spring 32 thus yields to permit the valve to be disposed so that the conical member 70 may pass the free end of rod 35 which thereafter is returned to its full line position by the spring 32 when the valve is moved to its normal full open position, as shown in full lines. It will be observed that the conical member 70 and the free edge of rod 35, by virtue of the aforedescribed shapes thereof, at the best, may have line contact with each other, which is insufficient to cause jamming or sticking of such parts with each other.

If the gas pressure flowing through the valve falls below the desired pre-determined minimum of the range of pressure desired, the diaphragm 23 and link 28 are urged downward by spring 26 and the unsupported weight of the diaphragm. The ends of the links 29 and 30 adjacent the pivotal connection 36 are in turn forced downward, thereby pulling rod 35 to the right from the position shown in Figure 1, an amount sufficient to cause the rod 35 to be pulled from under the valve stem 41. The valve member 40 then falls, due to gravity, to the seat 39 formed on the valve member 12, as shown by the dotted lines in Figure 1, and prevents the resumption of the flow of gas until the pressure returns to normal, and the valve is reset. The valve member 40 may be reset to its open position when the gas pressure returns to normal, by operating the reset member 44 in a manner previously described. It will be observed that the low pressure limit of the valve is determined by the weight of the diaphragm 23 and the weight supported thereby, including members 24 and 25, the spring 26, the rod 28 and the links 29 and 30. Adjustment may be readily made by substitution of panels 23c and 23d of ranging weight.

The use of the toggle linkage mechanism above described, provides a positive tripping action for closing the valve. Also, in my valve, due to the powerful action of the toggle linkage, no position of the rod 35, short of actually releasing the valve member 40, will prevent the rod 35 from returning to its normal position when the gas pressure returns to normal. Due to the toggle mechanism, the rod 35 may be in a near-release position, but will not trip the valve member 40 if jarred or vibrated. The toggle mechanism is also more certain to be operative after long periods of inactivity, such as might take place in service, because the fluctuations in gas pressure causes the diaphragm to move periodically within the permissible pressure range, which in turn moves the links of the toggle mechanism, thus preventing the links from sticking due to the collection of dust or corrosion.

The maximum pressure at which the flow of gas is shut off is determined primarily by the resistance characteristics of the spring 26. The stronger the spring, the higher the pressure that must be attained before the valve member 40 is released, while the weaker the spring, the lower the pressure that must be attained before the valve member 40 is released. The minimum pressure at which the flow of gas is shut off is determined primarily by the weight of the discs of the diaphragm 23. The lighter the diaphragm, the lower the minimum tripping pressure, and the heavier the diaphragm, the higher the minimum tripping pressure.

While I have shown what I consider to be a preferred embodiment of my invention, it will be understood that various modifications and rearrangements may be made therein, without departing from the spirit and scope of my invention.

I claim:

1. A valve construction comprising, in combination, a housing having first and second chambers, a valve body member extending upwardly and constituting an extension of said first chamber portion, a tubular housing member secured about said valve body member and constituting an extension thereof, the upper end of said tubular housing member having an inlet opening, an outlet opening in said first chamber, a valve seat at the upper end of said valve body member, a valve mounted for movement toward and away from said valve seat to open and close the same, a rod extending between said first and second chambers and mounted for movement transversely of said valve, said valve being adapted to rest on one end portion of said rod to dispose normally said valve in its open position, a cover member closing said second chamber, a diaphragm disposed between said cover member and said second chamber, a port between said first and second chambers for admitting fluid under pressure from said first chamber to said second chamber and below said diaphragm, and toggle linkage means between said diaphragm and the other end of said rod for translating the movement of said diaphragm in response to predetermined high and low fluid pressures in said first chamber into movement of said rod out of engagement with said valve to permit the latter to close.

2. The valve construction set forth in claim 1, wherein the valve comprises an enlarged head portion adapted to seat on the valve seat and a vertical stem portion, and in which the valve body member includes guide means for loosely receiving the valve stem for vertical movement of the valve.

3. The valve construction of claim 2, wherein the toggle linkage mechanism comprises first, second, and third links pivotally secured adjacent their one ends, the other end of said first link being pivotally secured to an anchor member, said anchor member projecting through the wall of said second chamber, the other end of said second link being secured to said diaphragm, the other end of said third link being pivotally secured to the other end portion of said rod, and said first and third links, said rod, and said anchor member being aligned substantially lengthwise in the normal open position of said valve.

4. The valve construction of claim 3, wherein a coil spring is disposed in the second chamber between the diaphragm and the cover member.

5. The valve construction of claim 4, wherein reset means is provided to return the valve to the open position after closing of the same.

6. The valve construction of claim 5, wherein the reset means includes a portion for actuating the same, accessible from the exterior of the housing.

PAUL L. BORN.

REFERENCES CITED

The following references are of record in the file of this patent:

UNITED STATES PATENTS

| Number | Name | Date |
|---|---|---|
| 357,720 | Livingston | Feb. 15, 1887 |
| 723,402 | Moore | Mar. 24, 1903 |
| 819,492 | Wylie | May 1, 1906 |
| 1,320,451 | Dalem | Nov. 4, 1919 |
| 1,677,729 | Sams | July 17, 1928 |
| 1,681,041 | Kimbrough | Aug. 14, 1928 |